United States Patent
Heinloth et al.

(10) Patent No.: US 8,500,375 B2
(45) Date of Patent: Aug. 6, 2013

(54) CUTTING INSERT, IN PARTICULAR, FOR CRANKSHAFT MACHINING

(75) Inventors: Markus Heinloth, Postbauer-Heng (DE); Jürgen Bär, Fürth (DE); Martin Hausmann, Ratingen (DE); Carsten Schwaner, Mülheim/Ruhr (DE)

(73) Assignee: Kennametal Widia Produktions GmbH & Co.KG, Essen (DE)

( * ) Notice: Subject to any disclaimer, the term of this patent is extended or adjusted under 35 U.S.C. 154(b) by 977 days.

(21) Appl. No.: 11/919,112

(22) PCT Filed: Apr. 4, 2006

(86) PCT No.: PCT/DE2006/000596
§ 371 (c)(1),
(2), (4) Date: Mar. 22, 2010

(87) PCT Pub. No.: WO2006/128410
PCT Pub. Date: Dec. 7, 2006

(65) Prior Publication Data
US 2010/0183386 A1    Jul. 22, 2010

(30) Foreign Application Priority Data
Jun. 2, 2005   (DE) .......................... 10 2005 025 815

(51) Int. Cl.
*B23C 5/20* (2006.01)
(52) U.S. Cl.
USPC ........................................... 407/113; 407/60

(58) Field of Classification Search
CPC ................ B23C 3/06; B23C 5/20; B23C 5/12
USPC ................................ 407/113, 114, 60, 61, 42
See application file for complete search history.

(56) References Cited

U.S. PATENT DOCUMENTS

| | | | | |
|---|---|---|---|---|
| 4,294,566 | A * | 10/1981 | Boone | 407/114 |
| 4,743,144 | A * | 5/1988 | Shikata | 407/42 |
| 5,256,009 | A * | 10/1993 | Stoffels | 407/42 |
| 5,275,633 | A | 1/1994 | Johansson | |

(Continued)

FOREIGN PATENT DOCUMENTS

| DE | 1 602 795 | 3/1967 |
|---|---|---|
| DE | 197 39 300 A1 | 3/1999 |

(Continued)

OTHER PUBLICATIONS

Ingersoll Cutting Tools, T-Force Double Sided Inserts.*

(Continued)

*Primary Examiner* — Daniel Howell
*Assistant Examiner* — Ryan Rufo
(74) *Attorney, Agent, or Firm* — Larry R. Meenan, Esq.

(57) ABSTRACT

The invention relates to a cutting insert (10) with a base, having a supporting surface, a covering surface, at a distance therefrom and side faces (101, 102), connecting said surfaces, whereby two or several adjacent surfaces form cutting edges (103, 104, 105). According to said invention, the supporting surface is connected in a non-detachable manner to a supporting surface of a cutting plate (11), the geometry of which is different from the cutting insert (10) and suitable for another metal cutting operation.

9 Claims, 1 Drawing Sheet

U.S. PATENT DOCUMENTS

| | | | |
|---|---|---|---|
| 5,775,855 A * | 7/1998 | Reiterman et al. | 407/42 |
| 6,109,838 A * | 8/2000 | Riviere | 407/36 |
| 6,120,219 A * | 9/2000 | Satran et al. | 407/113 |
| 6,146,063 A | 11/2000 | Ramold | |
| 6,227,772 B1 | 5/2001 | Heinloth | |
| 6,270,292 B1 * | 8/2001 | Satran et al. | 407/42 |
| 6,273,651 B1 | 8/2001 | Heinloth | |
| 7,275,895 B2 | 10/2007 | Heinloth | |
| 7,572,087 B2 * | 8/2009 | Nagaya et al. | 407/113 |
| 2003/0063954 A1 | 4/2003 | Nerlich et al. | |
| 2003/0215294 A1 * | 11/2003 | Wermeister et al. | 407/113 |
| 2006/0165501 A1 | 7/2006 | Heinloth | |
| 2006/0269366 A1 * | 11/2006 | Rieth | 407/113 |

FOREIGN PATENT DOCUMENTS

| | | |
|---|---|---|
| DE | 103 26 662 A1 | 1/2005 |
| EP | 1 291 105 A1 | 8/2002 |
| JP | 5-116018 * | 5/1993 |
| JP | 2000-24824 * | 1/2000 |
| JP | 2000-024824 A | 1/2000 |
| JP | 2004-042254 A | 2/2004 |
| WO | 99/12685 A1 | 3/1999 |

OTHER PUBLICATIONS

Ingersoll Cutting Tools, Ingersoll Cutting Tools-IMC (2006).*

* cited by examiner

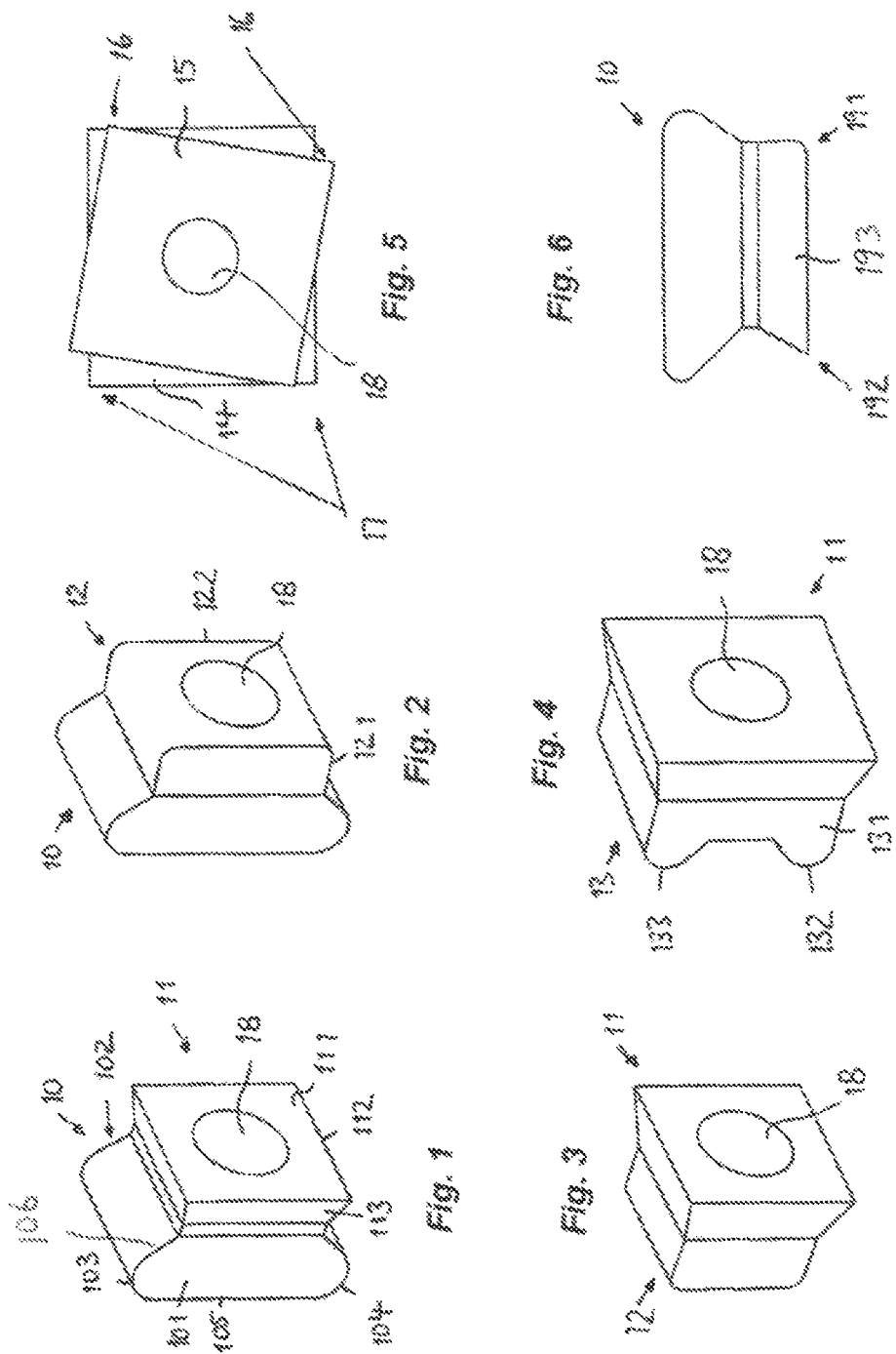

CUTTING INSERT, IN PARTICULAR, FOR CRANKSHAFT MACHINING

CROSS REFERENCE TO RELATED APPLICATIONS

This application is the US national phase of PCT application PCT/DE2006/000596, filed 4 Apr. 2006, published 7 Dec. 2006 as WO 2006/128410, and claiming the priority of German patent application 102005025815.8 itself filed 2 Jun. 2005, whose entire disclosures are herewith incorporated by reference.

According to the state of the art almost countless cutting insert variants are known for machining operations, and the shape of the cutting inserts is coordinated essentially with the machining operations of boring, turning on a lathe or milling and with the workpiece to be worked as well as with its shaping. The cutting inserts known according to the state of the art are designed as so-called indexable inserts, that is, they have several cutting edges that can be successively used. Depending on the basic body shape of the indexable inserts, four or up to eight useable cutting edges result. In the case of a cutting insert with a positive clearance angle that has a substantially square face, four usable cutting edges result. Reference is made to the cutting insert according to DE 197 04 931 C1 [U.S. Pat. No. 6,227,772] as an example for up to eight usable cutting edges and that has two rather large longitudinal faces that each have a projecting flange in the middle along their longitudinal axis. The cutting edges delimiting these longitudinal faces form an angle between 70° and 90° with their end and the short rounded edges of the upper and lower face. Several such cutting inserts are fixed on a milling tool and used to work crankshafts. In the so-called outside milling of crankshafts rotating disk milling tools are pressed radially onto a crankshaft, that is rotated. Different cuts serve to produce the journal diameter, the flanks, the oil ridge and the undercut by means of the radially or tangentially fixed cutting inserts. Essentially, in the working of crankshafts a distinction is made between indexable inserts for roughing, for machining an undercut, for machining the journal diameter and the oil ridge or oil ridges. FIGS. 3 and 4 of EP 0 830 228 B1 [U.S. Pat. No. 6,146,063] show typical shapes of cutting-edge inserts used for working the journal diameter as well as for working the undercut. Different cutting inserts are also used in face mills for rough or finish milling.

Workpiece expense can be reduced if the tool used for working has a large number of usable cutting edges. The number of actively usable cutting edges that can be achieved by shaping a cutting insert appears to be exhausted according to the state of the art. The indexable inserts required for different machining operations entail an expensive storage with corresponding expenses.

The invention therefore has the problem of improving the possibilities for the functioning of a cutting insert.

This problem is solved by the cutting insert according to claim 1. This cutting insert has a basic body comprising a mounting face and an end face set at a spacing from it as well as side faces connecting these faces, and in which two or more adjacent faces form cutting edges. The cited mounting face is non-detachably connected to a mounting face of a cutting plate that has a shape different from the cutting insert, which is suitable for another machining operation. In other words, the cutting insert of the invention is composed in principle of two different cutting tools connected to one another at their mounting faces. This gives the advantage that different machining operations can be carried out with the cited combination cutting insert. The cutting insert of the invention can also be manufactured considerably more inexpensively and minimizes the storage expense.

The non-detachable connection of the two mounting faces is preferably created by sintering to a one-piece body. Cutting inserts with a cutting plate are made by powder metallurgy to a green compact, after which this green compact is sintered with the two mounting faces placed on one another. The cutting insert has a bore for receiving a mounting screw. This bore extends from one end face to the opposite end face.

Depending on how the cutting insert is to be used, it can be radially or axially fixed, e.g., on a milling tool, in accordance with the provided cutting geometry.

In a first concrete embodiment the cutting plate has an end face that is designed viewed from above as a surface that is preferably square. The cutting insert itself has two side faces designed as oppositely directed faces and with curved cutting edges for forming an undercut in the milling of crankshafts. An undercut or the journal diameter is formed with the cutting insert, depending on the insertion position.

According to a further embodiment the cutting insert can be characterized by two side faces designed as oppositely directed clamping faces and delimited by a cutting edge designed in a straight shape and curved in the 90° corners so that this cutting insert is suitable in particular for cutting an oil ridge shape on a crankshaft. The cutting plate comprises two side faces designed as oppositely directed clamping faces and with curved cutting edges for forming an undercut.

In a further embodiment a combination of a cutting insert, suitable for forming an oil ridge, can be connected to a corresponding cutting insert for working the journal diameter.

In a third design a cutting insert for the machining working of a journal diameter can be combined with such a cutting insert for forming an undercut, in which case the curved cutting edge sections are extending substantially perpendicular to the mounting face.

According to a further embodiment the confronting mounting faces, which are in particular substantially square, can be rotated relative to one another so that even the cutting edges that are formed by appropriate side faces can be rotated relative to each other.

According to a further embodiment of the invention the mounting screw should not be longer than the particular cutting edges or the longest cutting edge, which prevents the screw from being too long. The cutting insert in accordance with the invention can optionally be arranged in cassettes of a tool carrier that are fastened for their part on the tool carrier. Such "combined cutting inserts" are preferably manufactured from the same material, e.g., from a hard metal or a cermet material that can also be formed in one or more layers in order to improve the wear properties or the cutting properties. However, it is also conceivable that the two bodies, that can be connected to one another to a uniform total body, are made of different materials, in which instance, however, it must be ensured that the connection of the two mounting faces is stable.

Embodiments of the invention are shown in the drawings. Therein:

FIGS. 1-4 are perspective views of different cutting inserts in accordance with the invention, FIG. 5 is a top view of a further embodiment of a cutting edge insert, and FIG. 6 shows a further embodiment of a cutting insert in accordance with the invention.

The cutting inserts shown in FIGS. 1 to 4 are suited in particular for the manufacture of a crankshaft. Each of the cutting inserts shown in FIGS. 1 to 4 constitutes a combination tool composed of two cutting inserts that are connected to one another at their particular (imaginary) mounting faces to a one-piece body. Thus, the cutting insert shown in FIG. 1 is principally composed of an indexable insert 10 that is suitable for machining undercuts and of an indexable insert 11 for machining a journal diameter. Reference numeral 12 designates in FIGS. 2 and 3 so-called indexable inserts for forming an oil ridge. Reference numeral 13 relates to another version of an indexable insert for machining an undercut into a crankshaft.

The indexable insert 10 has two oppositely directed side faces 101 and 102 that are defined by curved cutting edges 103 and 104 as well as by straight cutting edges 105. The end face extending from the imaginary and covered mounting face comprises a curvature 106 on the edge and an end face on the top. The indexable insert 11 has an end face 111 delimited by cutting edges 112 that also form the boundaries of four side faces 113. In the present case these side faces 113 are inclined at a positive clearance angle and in the lower area of indexable insert 11 the side faces can run out perpendicular to the end face. The imaginary mounting faces that are connected to each other are selected to be of the same size in the present instance. The cutting edges 103 and 104 project slightly laterally past the cutting edges 112.

In FIG. 2 an indexable insert 10 of the type already described is combined with an indexable insert 12 that has side faces 121 adjacent the imaginary mounting face, designed as mounting faces, delimited by cutting edges 122, and having straight cutting-edge sections standing substantially perpendicular to each other and cutting-edge sections that are curved in the corners.

In the embodiment according to FIG. 3 the previously described indexable insert 12 is connected to an indexable insert 11 of the type shown and described in FIG. 1. Here the side faces are designed to be uniformly plane.

According to FIG. 4 the cutting insert in accordance with the invention has two indexable inserts 11 and 13 of which indexable insert 13 is also designed for machining an undercut. The side faces 131 are each delimited by a cutting edge 132 comprising two bumps 133 that allow a corresponding undercut shape to be cut.

In the embodiment according to FIG. 5 two cutting inserts 14 and 15 are combined with one another that have a right-angle or square end-face shape; however, the particular mounting faces are arranged slightly rotated relative to one another so that even the cutting edges between corner points 16 and 17 extend at acute angles relative to each other.

In the cutting insert shown in FIG. 6 a cutting insert 10 for machining a crankshaft undercut is combined with a cutting insert 191 that has a cutting corner extending over an angle of 90° for forming an oil ridge, or a 90° shoulder that has a cutting edge on the opposite side 192 suitable for machining a journal diameter on a crankshaft. The free face 193 is inclined on this side by a positive clearance.

All indexable inserts are perforated by a common fastening hole 18 extending from end face to end face.

In principle, even other illustrated embodiments can be combined with each other in which two cutting-edge inserts with different shapes are combined with one another whose shape is coordinated with different machining operations to which a single workpiece is subjected.

The invention claimed is:

1. A combination cutting insert comprising a first indexable cutting insert and a second indexable cutting insert non-detachably connected to the first indexable cutting insert, wherein the first indexable cutting insert has a first geometry adapted to perform a first cutting operation on a crankshaft, and wherein the second indexable cutting insert has a different geometry than the first indexable cutting insert and is adapted to perform a second, different cutting operation on the crankshaft, and wherein the first indexable cutting insert is rotated relative to the second indexable cutting insert.

2. The combination cutting insert according to claim 1, wherein a one-piece body is formed by sintering the first indexable cutting insert to the second indexable cutting insert.

3. The combination cutting insert according to claim 1, wherein the second indexable cutting insert includes an end face, a plurality of side faces and a cutting edge at an intersection between the side faces and the end face, and wherein the plurality of side faces are inclined at a positive clearance angle with respect to the end face.

4. A combination cutting insert comprising a first indexable cutting insert and a second indexable cutting insert non-detachably connected to the first indexable cutting insert, wherein the first indexable cutting insert includes two oppositely positioned side faces, each side face defined by curved cutting edges and a straight cutting edge therebetween for forming an undercut into a crankshaft, and wherein the second indexable cutting insert includes two oppositely positioned side faces, and wherein the side faces are provided with cutting edges, each cutting edge having a straight line portion and an arch-shaped portion with 90° corners for forming an oil ridge on the crankshaft in a second, different cutting operation, and wherein the first indexable cutting insert is rotated relative to the second indexable cutting insert.

5. A combination cutting insert comprising a first indexable cutting insert and a second indexable cutting insert non-detachably connected to the first indexable cutting insert, wherein the first indexable cutting insert includes two bumps for forming an undercut into a crankshaft, and wherein the second indexable cutting insert includes an end face, a plurality of side faces and a plurality of cutting edges formed at an intersection between the plurality of side faces and the end face.

6. The combination cutting insert according to claim 5, wherein the first indexable cutting insert is rotated relative to the second indexable cutting insert.

7. The combination cutting insert according to claim 5, wherein the plurality of side faces are perpendicular to the end face.

8. The combination cutting insert according to claim 1, wherein the first indexable cutting insert includes two oppositely positioned side faces, each side face defined by curved cutting edges and a straight cutting edge therebetween.

9. A combination cutting insert comprising a first indexable cutting insert and a second indexable cutting insert non-detachably connected to the first indexable cutting insert, wherein the first indexable cutting insert has a first geometry adapted to perform a first cutting operation on a crankshaft, and wherein the second indexable cutting insert has a different geometry than the first indexable cutting insert and is adapted to perform a second, different cutting operation on the crankshaft, wherein the second indexable cutting insert includes a cutting corner for forming an oil ridge on the crankshaft and a cutting edge on an opposite side suitable for machining a journal diameter on the crankshaft.

* * * * *